(12) United States Patent
St-Jean et al.

(10) Patent No.: US 12,462,176 B2
(45) Date of Patent: Nov. 4, 2025

(54) QUANTUM COMPUTER, AND METHOD OF PERFORMING QUANTUM COMPUTING

(71) Applicant: NORD QUANTIQUE INC., Sherbrooke (CA)

(72) Inventors: Philippe St-Jean, Sherbrooke (CA); Dany Lachance-Quirion, Sherbrooke (CA)

(73) Assignee: Nord Quantique Inc., Sherbrooke (CA)

( * ) Notice: Subject to any disclaimer, the term of this patent is extended or adjusted under 35 U.S.C. 154(b) by 0 days.

(21) Appl. No.: 17/760,212

(22) PCT Filed: Mar. 17, 2022

(86) PCT No.: PCT/CA2022/050402
§ 371 (c)(1),
(2) Date: Aug. 5, 2022

(87) PCT Pub. No.: WO2022/193019
PCT Pub. Date: Sep. 22, 2022

(65) Prior Publication Data
US 2024/0185112 A1    Jun. 6, 2024

(51) Int. Cl.
*G06N 10/40*    (2022.01)

(52) U.S. Cl.
CPC .................. *G06N 10/40* (2022.01)

(58) Field of Classification Search
CPC ........ G06N 10/40; G06N 10/70; G06N 10/20; B82Y 10/00
See application file for complete search history.

(56) References Cited

U.S. PATENT DOCUMENTS

| | | | | |
|---|---|---|---|---|
| 11,037,068 B2* | 6/2021 | Girvin | ..................... | G06N 10/40 |
| 11,106,991 B2* | 8/2021 | Jiang | ..................... | G06N 10/40 |
| 11,409,343 B2* | 8/2022 | Chakraborty | .......... | G06N 10/40 |
| 2004/0238813 A1* | 12/2004 | Lidar | ..................... | G06N 10/20 |
| | | | | 257/31 |
| 2018/0032895 A1* | 2/2018 | Jiang | ..................... | G06N 10/20 |

(Continued)

OTHER PUBLICATIONS

International Search Report from corresponding international application No. PCT/CA2022/050402, Jun. 29, 2022.

(Continued)

*Primary Examiner* — David A Vanore
(74) *Attorney, Agent, or Firm* — Stratford Group Ltd.

(57) ABSTRACT

The system can include a quantum subsystem drivable to host a bosonic cat state having N coherent states wherein N is greater than two, the N coherent states defining a computational space; a controller operably connected to control driving hardware in accordance with control instructions, wherein at least one interaction type between the bosonic cat state and an environment which do not stem from the control instructions lead to phase shifting of the N coherent states, wherein the control instructions include a function to generate an initial state of the bosonic cat state defined as a given superposition of two distinct logical states representing logical information, the two distinct logical states spanning a logical subspace within the computational space, wherein any phase shifting from the initial state either leads to a modified state which lies outside the logical subspace while preserving said logical information, or back to the initial state.

8 Claims, 8 Drawing Sheets

(56) References Cited

U.S. PATENT DOCUMENTS

| | | | | |
|---|---|---|---|---|
| 2019/0049495 | A1* | 2/2019 | Ofek | G06N 10/70 |
| 2020/0334104 | A1* | 10/2020 | Rosenblum | G06N 10/70 |
| 2020/0412369 | A1* | 12/2020 | Jiang | G06N 10/20 |
| 2021/0256413 | A1* | 8/2021 | Hollenberg | H01L 29/66977 |
| 2023/0155594 | A1* | 5/2023 | Camirand Lemyre | H10N 60/0912 326/3 |
| 2024/0005191 | A1* | 1/2024 | Lachance-Quirion | G06N 10/20 |
| 2024/0013086 | A1* | 1/2024 | Lachance-Quirion | G06N 10/40 |
| 2024/0185112 | A1* | 6/2024 | St-Jean | G06N 10/70 |
| 2024/0420007 | A1* | 12/2024 | Royer | G06N 10/40 |

OTHER PUBLICATIONS

Ofek et al., "Extending the lifetime of a quantum bit with error correction in superconducting circuits". Nature, Jul. 20, 2016 (Jul. 20, 2016), vol. 536, pp. 441-445, ISSN doi: 10.1038/nature 18949 [online] [retrieved on Jun. 2, 2022 (Jun. 2, 2022)]. Retrieved from the Internet: <https://www.nature.com/articles/naturel 8949#Sec2> * abstract; p. 441, left column, 2nd paragraph to p. 442, right column, 1st paragraph, p. 442, right column, 3rd paragraph; fig. 1*.

Vlastakis et al., "Deterministically Encoding Quantum Information Using 100-Photon Schrodinger Cat States". ScienceMag, Nov. 1, 2013 (Nov. 1, 2013), vol. 342(6158), pp. 607-610, ISSN DOI: 10.1126/science.1243289 [online] [retrieved on Jun. 2, 2022 (Jun. 2, 2022)]. Retrieved from the Internet: <https://www.science.org/doi/10.1126/science.1243289> * abstract; p. 609, right column, 2nd paragraph; fig. 4*.

Bergmann et al., "Quantum error correction against photon loss using multi-component cat states". arXiv, May 2, 2016 (May 2, 2016), pp. 1-32, [online] [retrieved on Jun. 2, 2022 (Jun. 2, 2022)]. Retrieved from the Internet: <https://arxiv.org/pdf/1605.00357.pdf> * whole document *.

Lescanne et al., "Exponential suppression of bit-flips in a qubit encoded in an oscillator". arXiv, Jul. 26, 2019 (Jul. 26, 2019), pp. 1-18, [online] [retrieved on Jun. 2, 2022 (Jun. 2, 2022)]. Retrieved from the Internet: <https://arxiv.org/pdf/1907.11729.pdf> * whole document *.

Vlastakis Brian et al: "Supplementary Materials for Deterministically Encoding Quantum Information Using 100-Photon Schrödinger Cat States", Science, vol. 342, No. 6158, Nov. 1, 2013, pp. 607-610, XP 93240875A, US ISSN: 0036-8075, DOI: 10.1126/science.1243289.

European Search Report for Application No. 22770140.6 dated Jan. 31, 2025.

* cited by examiner

QUANTUM COMPUTER, AND METHOD OF PERFORMING QUANTUM COMPUTING

This application is a U.S. National Stage of International Application No. PCT/CA2022/050402, filed Mar. 17, 2022, which claims the benefit of U.S. Provisional Application No. 63/163,231, filed Mar. 19, 2021, each of which is hereby incorporated by reference in its entirety.

FIELD OF THE DISCLOSURE

The present disclosure relates to quantum computing, and, in particular, to a quantum computer, and method of performing quantum computing.

BACKGROUND

Recently, the field of quantum computing has become an active research area because of the possibility to disrupt modern computation, communication and cryptography.

To make a contrast with classical computers, where information is stored physically in memory, retrieved, transmitted, and processed in binary form (bit), in a quantum computer, information, referred to here as quantum information, is stored physically in a memory by encoding it in the state of a quantum subsystem (qubit), can be processed by quantum algorithms, and measured (retrieved) based on Von Neumann entropy.

One of the main challenges faced in encoding quantum information in actual physical devices is balancing two contradicting requirements. Firstly, by nature, quantum information is fragile and is subject to destructive sources of decoherence. Unfortunately, most interactions with the environment are sources of decoherence. Hence, systems designed to store and process quantum information are typically isolated as much as possible from interactions with the environment. Secondly, for quantum information to be useful, one needs to be able to process it and ultimately access it, meaning that it needs to be controllable through interactions with an external control system, and for the processor to be efficient these controlling interactions must be performed at a relatively high frequency.

Because of this second requirement, errors in quantum information processing are very challenging to avoid. One generic approach inspired from the field of classical information processing has been to try to partially correct for those errors through redundancy, such as redundantly encoding the quantum information on additional physical resources. This approach is costly, and the typical overhead may be of the order of 10,000-fold for practical applications, making this approach unappealing for many practical applications.

A more recent approach has been to encode qubits in quantum subsystems that are natively richer, in a manner for the quantum information to be redundantly encoded within a single physical element. A promising avenue for this approach is in bosonic encodings, where the phase space of an individual system can offer a theoretically infinite-dimensional Hilbert space for encoding information.

In an encoding space of infinite size there are, in theory, an infinite number of ways of encoding a qubit in within it. In practice, a small number of promising candidates having interesting properties have emerged recently. One such candidate is the so-called cat-state encoding, whereas the qubit is encoded in a superposition of two quasi-classical coherent states of the system. While recent research on cat-state encoding has led to interesting results, there remains a need for improvement. In particular, there remains a need for simultaneously impeding bit-flip and phase-flip error types.

SUMMARY

In accordance with one aspect, there is provided a method of hosting, in a quantum subsystem, a bosonic cat state having N coherent states wherein N is greater than two, the N coherent states defining a computational space, the method comprising generating an initial state of the bosonic cat state, the initial state being a given superposition of two distinct logical states representing logical information, the two distinct logical states spanning a logical subspace within the computational space, the two logical states being defined in a manner that any phase shifting of the bosonic cat state from the initial state stemming from an uncontrolled interaction between the bosonic cat state and an environment is constrained to either lead to one or more modified state which lies outside the logical subspace while preserving said logical information, or back to the initial state.

In accordance with another aspect, there is provided a quantum system comprising a quantum subsystem drivable to host a bosonic cat state having N coherent states wherein N is greater than two, the N coherent states defining a computational space; driving hardware operably connected to drive the quantum subsystem to host the bosonic cat state; and a controller operably connected to control the driving hardware in accordance with control instructions, wherein at least one interaction type between the bosonic cat state and an environment which do not stem from the control instructions lead to phase shifting of the N coherent states, wherein the control instructions include a function to generate an initial state of the bosonic cat state defined as a given superposition of two distinct logical states representing logical information, the two distinct logical states spanning a logical subspace within the computational space, wherein any phase shifting from the initial state either leads to a modified state which lies outside the logical subspace while preserving said logical information, or back to the initial state.

In accordance with another aspect, there is provided control instructions stored in a non-transitory computer readable memory, the control instructions comprising: a function to, when executed by a computer, generate, in a quantum subsystem, an initial state of a bosonic cat state having N coherent states wherein N is greater than two, the N coherent states defining a computational space, the initial state defined as a given superposition of two distinct logical states representing logical information, the two distinct logical states spanning a logical subspace within the computational space, and in which at least one interaction type between the bosonic cat state and an environment which do not stem from the control instructions lead to phase shifting of the N coherent states, and a definition of the two distinct logical states, said definition constrains the evolution of the bosonic cat state from the initial state upon any of said phase shifting to either a modified state which lies outside the logical subspace while preserving said logical information of back to the initial state.

In accordance with another aspect, there is provided a quantum system comprising: a quantum subsystem drivable to host a cat state having N coherent states, the N coherent states representable as points around a circle in phase space of the quantum system, wherein N is greater than two, driving hardware operably connected to drive the quantum system to host the cat state by controlling a number of bosons in the quantum system, and a controller operably connected to control the driving hardware in a manner to encode two distinct logical states with the N coherent states, the logical states being rotationally asymmetric when the cat state is rotated around the circle due to boson loss of the quantum system.

In accordance with another aspect, there is provided a method of performing quantum processing comprising: driving a cat state having N coherent states in a quantum subsystem, the N coherent states representable as points around a circle in a phase space of the quantum subsystem, N being greater than two, said driving including controlling a number of bosons in the quantum system, encoding two distinct logical states with the N coherent states, the logical states being rotationally asymmetric when the cat state is rotated around the circle due to boson loss of the quantum system.

Many further features and combinations thereof concerning the present improvements will appear to those skilled in the art following a reading of the instant disclosure.

DESCRIPTION OF THE FIGURES

In the figures.

DETAILED DESCRIPTION

The quantum state of bosons in a resonator can be modelled as a quantum harmonic oscillator system. Any of its possible states can be described by a distribution over specific excitation level states (known as the bosonic number state basis, or Fock state basis). These states can also be represented by a quasi-distribution in two-dimensional phase space given by the Wigner transform of the wavefunction of the state.

The lowest energy state is known as the vacuum state. In phase space, its Wigner transform is represented by a circular quasi-gaussian distribution at the origin of the two quadratures of the Wigner transform.

Applying a displacement operator on the vacuum state results in what is defined as a coherent state, which representation in phase space is identical to the vacuum state, up to a translation.

This displacement can be parametrized by a complex number $\alpha$, whereas its real part describes the displacement along the horizontal quadrature and the imaginary part the displacement along the vertical quadrature.

Coherent states with values of $\alpha$ that share the same modulus all lie on a circle of radius $|\alpha|$, and they all represent states with identical average boson number (whereas $<n>=|\alpha|^2$).

A cat state can be defined as any superposition of an arbitrary number of coherent states lying on a circle centered at the origin of phase space, and as such sharing the same value of $|\alpha|$.

In particular, an n-cat state is a cat state formed from a superposition of n uniformly distributed states alongside the circumference of a circle of radius $|\alpha|$.

Figure 1C:
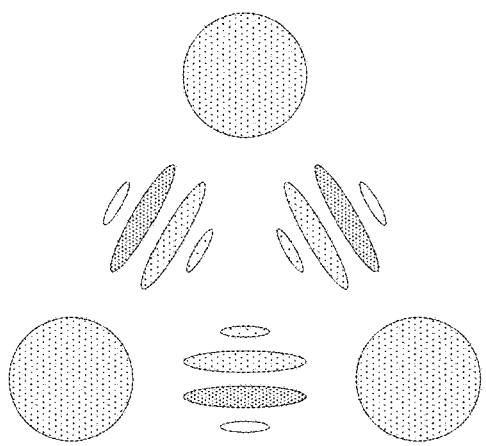
FIG. 1 presents more detailed phase space representations of a) 2-cat, b) 4-cat, c) 3-cat states, showing the superposition of coherent states (large circles), and the interference fringes they generate.
Figure 1B:
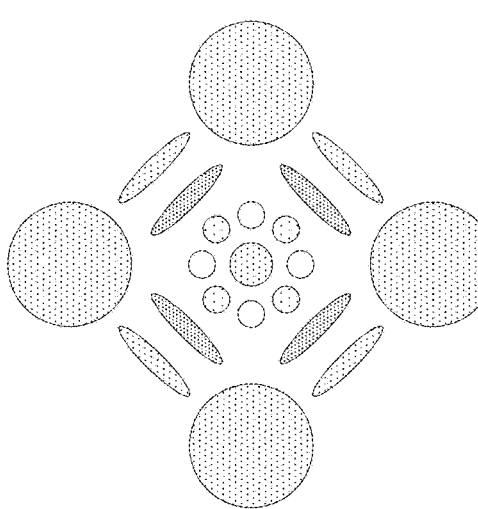
Figure 1A:
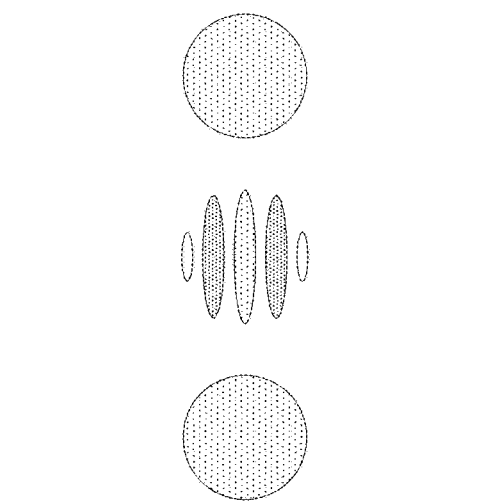

FIG. 1A presents an embodiment of a quantum subsystem hosting a cat state having two coherent states represented as equidistant points around a circle in phase space. Such a cat state can be referred to simply as a 2-cat.

A realization of a 2-cat state can be made long-lived using a stabilization mechanism using external EM drives. Such encoding can be robust to so-called bit-flip errors (where a pure state $|0>$ would become a $|1>$, or vice-versa). However, such encoding may not be robust to another significant error channel, namely phase-flips (where a given superposition of states, say $|0>+|1>$, would transform into a different superposition, e.g. $|0>-|1>$), under the effect of excitation loss (e.g. single photon loss) to the environment. This leaves a need for physical redundancy, even though the need for physical redundancy can be alleviated by addressing bit-flip type errors, one of the two main error channels. There thus remains a need for addressing both bit-flip and phase-flip error types simultaneously.

One possible source of error in a bosonic cat-state is single photon loss when the state of the system after this unwanted interaction occurs also represents a valid logical state. In such cases, it may not be possible to detect the error simply from the logical state. Namely, for a general qubit state given by:

$$|\varphi\rangle = u|\overline{0}\rangle + v|\overline{1}\rangle$$

where u is a non-negative real number smaller than one ($0 \leq u \leq 1$), and v is a complex number such that $u^2+|v|^2=1$, the impact of a single photon loss is to transform this state into $$|\varphi'\rangle = u|\overline{0}\rangle - v|\overline{1}\rangle$$

which is also a valid logical state, hence inducing an undetectable error in the system.

One potential approach to circumvent this issue is to use a cat state with a larger number of coherent components.

FIG. 1B presents an example embodiment where the quantum subsystem hosts a cat state having four coherent states instead of two. For the purpose of ease of later reference, let's refer to these four coherent component cat-states as "four legged cats", or simply 4-cats, and to the two coherent component cat-states as "two legged cats" or simply 2-cats. There are two distinct challenges facing this approach. Firstly, it appears much more challenging to stabilize these 4-cat states than to stabilize 2-cat states. Secondly, while 4-cat encoding can theoretically allow distinguishing single errors, doing so requires monitoring more frequently than the timeframe corresponding to a probability of boson loss, which may be quasi-continuous. In one embodiment, for instance, a single error missed can lead to a scenario where a second error leads to a phase-flip error, and can thus become undetectable.

It will be noted here that the second issue is somewhat conditional to the fact that the 4-cat logical encoding has rotational symmetry. Accordingly, in some embodiments, it can be preferred to select a N-cat logical encoding solution which does not have rotational symmetry, i.e. a N-cat logical encoding where any loss of n photons, where n<N, leads to a state which is outside of the logical basis, and which is thus detectable and potentially correctable.

This can be the case in a 3-cat logical encoding in particular, which, as will be presented below, appears particularly promising, a schematic embodiment of which is presented in FIG. 1C. The first logical state can be associated to two of the coherent components, whereas the second logical state can be associated to the other coherent component (or linear combinations thereof).

It was found that the rotational asymmetry condition can also be met in other N-cat logical encodings where N is greater than 2, including when N=4. For example, the non-rotational symmetry condition will necessarily be present when N is also a prime number, but can also be necessarily present in other relatively simple schemes, some of which will be detailed below. In other words, the following specification will explore encoding schemes in physical systems which can represent a richer set of N distinct quantum states where N>2 and the elected configuration does not exhibit rotational symmetry. A logical qubit can be defined in this manner. Moreover, the following specification will explore techniques allowing to perform operations on such a qubit that can correct an error which may have occurred due to an unwanted interaction with the environment which led to photon loss.

FIG. 1 presents phase space representations of a) 2-cat, b) 4-cat, c) 3-cat states, showing the superposition of coherent states (large circles), and the interference fringes they generate.

One weakness common to 2-cat and at least some higher order encoding schemes can be summarized perhaps most generally as configurations in which the cat state in which the logical state is encoded is such that when a boson loss occurs, the resulting state alteration leads to a logical subspace which is not distinct from the initial logical subspace. These configurations may not allow to detect the occurrence of a boson loss simply by determination of the state. One general technique to address this issue is to use a configuration in which one (or ideally one or more) boson loss(es) from an initial state leads to a logical subspace which is clearly distinct from the initial logical subspace.

One example way to implement this general technique is to select an encoding scheme which does not have rotational symmetry. Indeed, in these configurations, boson loss from an initial state can lead to a logical subspace which is clearly distinct from the initial logical subspace, allowing to detect the error. Segmentation schemes can be used to segment the logical subspace into two logical states. Several example segmentation schemes which do not have rotational symmetry will be presented below, such as segmentation schemes using a prime number of coherent components, or segmentation schemes encoding one logical state in one of the coherent components and the other logical state in the combination of the other coherent components. The simplest case is perhaps the case of a cat encoding scheme having 3 coherent states where a first logical state is encoded in a first one of the coherent states, and the second logical state is encoded in the combination of the two other coherent states. This simplest case may be preferred in some embodiments for a number of reasons, such as further facilitating stabilization and the like, but it will be understood that other segmentation schemes in which boson losses lead to distinct logical sub-states and are thus detectable. It will be noted, for instance, that some alternate suitable encoding schemes may result from careful selection of a linear combination selected to define the logical states which break the symmetry of an otherwise symmetrical coherent component configuration in a cat state.

We will begin by exploring a first example based on a 3-cat configuration before exploring further example embodiments.

Example Embodiment

Attribution of Coherent States to Logical States

We will now detail an example embodiment based on a quantum subsystem where N=3 (and which can be referred to as a qutrit or a cubic cat state), which is segmented by choosing a single coherent state as the logical |0>, and a combination of the two others as the logical |1> (or vice-versa).

We begin with the task of defining the two logical qubit states. For N=3, there are 3 native coherent states, namely $|\alpha\rangle, |\alpha e^{2\pi i/3}\rangle, |\alpha e^{-2\pi i/3}\rangle$ where $\alpha$ is a positive real number that is typically referred to as the "size" of the cat, since in the phase space representation it corresponds to the radius of the circle on which each coherent component state (often referred to as "leg") of the cat state lies. From these three coherent states, we choose a valid segmentation for which the first of these 3 states will represent the |0> logical state, and the two others the logical |1> state. The logical |0> is then trivially defined as $|\bar{0}\rangle = |\alpha\rangle$ For the |1> logical state, a choice must be made in order to define it. In this example, with a view to simplicity, we make the following choice:

$|\bar{1}\rangle \sim \frac{1}{\sqrt{2}}(|\alpha e^{2\pi i/3}\rangle + |\alpha e^{-2\pi i/3}\rangle)$ where the ~ symbol signifies that the state is proportional to the right-hand side of the expression above, as an additional normalization factor comes into the definition of the state. This normalization is typically a number close to 1 for reasonably large values of $\alpha$.

We define a third quasi-orthogonal state that proves useful in further demonstration, namely $|\bar{2}\rangle \sim \frac{1}{\sqrt{2}}(|\alpha e^{2\pi i/3}\rangle - |\alpha e^{-2\pi i/3}\rangle)$ and we refer to this state as an "ancilla" state.
Starting from a general logical qubit state $|\varphi\rangle = u|\bar{0}\rangle + v e^{i\phi}|\bar{1}\rangle$ where $u, v \in \mathbb{R}, u^2 + v^2 = 1, \phi \in [0, 2\pi]$, then the state will transform in the following way for a single or a double photon loss:

$$|\varphi'\rangle \equiv \hat{a}|\varphi\rangle \sim u|\overline{0}\rangle - \frac{1}{2}ve^{i\phi}|\overline{1}\rangle + \frac{i\sqrt{3}}{2}ve^{i\phi}|\overline{2}\rangle,$$

$$|\varphi''\rangle \equiv \hat{a}^2|\varphi\rangle \sim u|\overline{0}\rangle - \frac{1}{2}ve^{i\phi}|\overline{1}\rangle - \frac{i\sqrt{3}}{2}ve^{i\phi}|\overline{2}\rangle.$$

If the system suffers 3 photon losses, the state comes back exactly to its original state in this model. This means that there are only 3 possible states that the system can cycle through, for any number of photon losses. Most importantly, these two other states are not in the logical basis, as they involve the third qutrit state |2>. Hence they are distinguishable, and they don't destroy the relative values of u, v, and φ which carry the logical quantum information that must be preserved. This works thanks to the process of 1) finding a proper segmentation of the native coherent states into two subsets that avoids rotational symmetry in the phase-space representation, 2) defining two logical states on these subsets that are non-trivial and quasi-orthogonal or preferably orthogonal.

Stabilisation of Coherent States

In order to ensure a longer lifetime of the quantum information encoded in the qubit, it can be suitable to implement a stabilization process. We propose a specific method to generate a Hamiltonian with the desired properties in order to stabilize a three-legged cat. The form of the proposed Hamiltonian in the rotating frame is given by $$H_{NEW} = -K\hat{a}^{\dagger 2}\hat{a}^2 + \varepsilon_3(\hat{a}^{\dagger 3} + \hat{a}^3) + \Delta \hat{a}^\dagger \hat{a}$$

Where K is the amplitude of the Kerr nonlinearity term, $\varepsilon_3$ is the amplitude of the three-photon drive, and $\Delta$ is the detuning between the drive and the resonator frequency. Careful selection of these parameters allows to generate a meta-potential that stabilizes a cubic cat state with quasi-degeneracy of the three coherent legs. Additional single-photon and dual-photon drives can be used to fine tune the relative energy minima of each state.

The rationale behind this proposition is that it allows to make use of the naturally occurring Kerr term, alongside a 3-photon pump and a detuning term.

In order to understand how this works, it can be useful to rewrite the Hamiltonian in the displaced frame in order to see how a proper choice of parameters allow certain terms to become negligible, such that the vacuum becomes an eigenstate in this frame:

$$H_{NEW}' = [-2K\alpha^2\alpha + 3\varepsilon_3\alpha^{*2} + \Delta\alpha]\hat{a}^\dagger + [-K\alpha^2 - 3\varepsilon_3\alpha^*]\hat{a}^{\dagger 2} + \varepsilon_3\hat{a}^{\dagger 3} + [-4K|\alpha|^2 + \Delta]\hat{a}^\dagger\hat{a} + H_{others},$$

where it is understood that there are additional Hermitian complements in the first three terms (eluded for clarity). By simple inspection, it is seen that the sole term in $\hat{a}^{\dagger 3}$ can't be brought to zero. However, this is not a problem as long as the choice of parameters ensures that it remains small with respect to the $\hat{a}^\dagger\hat{a}$ detuning term. This would be respected for instance for a choice of parameter such that $|\varepsilon_3| < |\Delta|$, as shown below.

Back to the first term, we write $$\alpha = |\alpha|e^{i\theta};$$

Then, one has that $$\alpha^{*2} = |\alpha|\alpha \Leftrightarrow \theta \in \left\{0, \frac{2\pi}{3}, -\frac{2\pi}{3}\right\}.$$

When this is the case, the first term can be rewritten as $$\alpha[-2K|\alpha|^2 + 3\varepsilon_3|\alpha| + \Delta]\hat{a}^\dagger.$$

This is quadratic in $|\alpha|$, and it admits real roots when the determinant $$9\varepsilon_3^2 + 8K\Delta > 0.$$

In particular, when $$|\varepsilon_3| \ll |\Delta|$$

one gets $$|\alpha| \simeq \sqrt{\frac{\Delta}{2K}}.$$

The squeezing term in $\hat{a}^{\dagger 2}$ can be suppressed when $$\varepsilon_3 \simeq -\frac{K}{3}|\alpha|.$$

Also if the condition on the absolute value of $\alpha$ (as above) is respected, then the detuning term in $\hat{a}^\dagger\hat{a}$ is approximately equal to $-\Delta$, and in return ensures that this term is significantly larger than the $a^3$ term when $|\varepsilon_3| < |\Delta|$, which was the intent of this demonstration.

Figure 2:
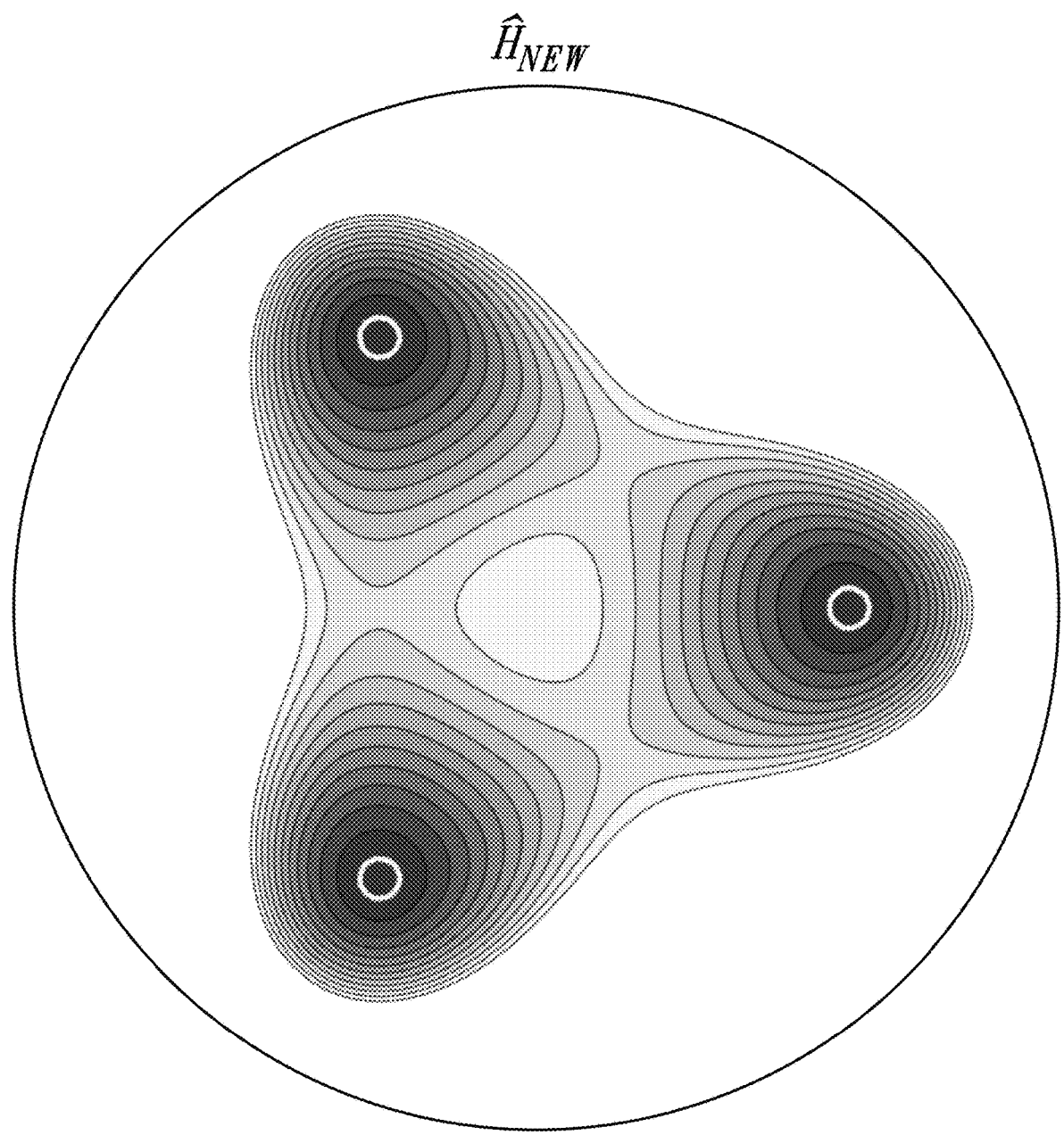
FIG. 2 is a meta-potential representation of Hamiltonian stabilization.

This proposed Hamiltonian stabilization is presented in meta-potential representation in FIG. 2. Note that the meta-potential remains quasi-circular around the minima, which can help avoid squeezing deformation of the stabilized states.

Operations on the Logical Qubit

The operations to be performed on the proposed cubic cat qubits depend to a certain extent on the choice of architecture of the full processor. There are a number of competing architectures. Example embodiments for two of these will be provided below: quantum annealers and gate-based quantum processors.

Figure 3:
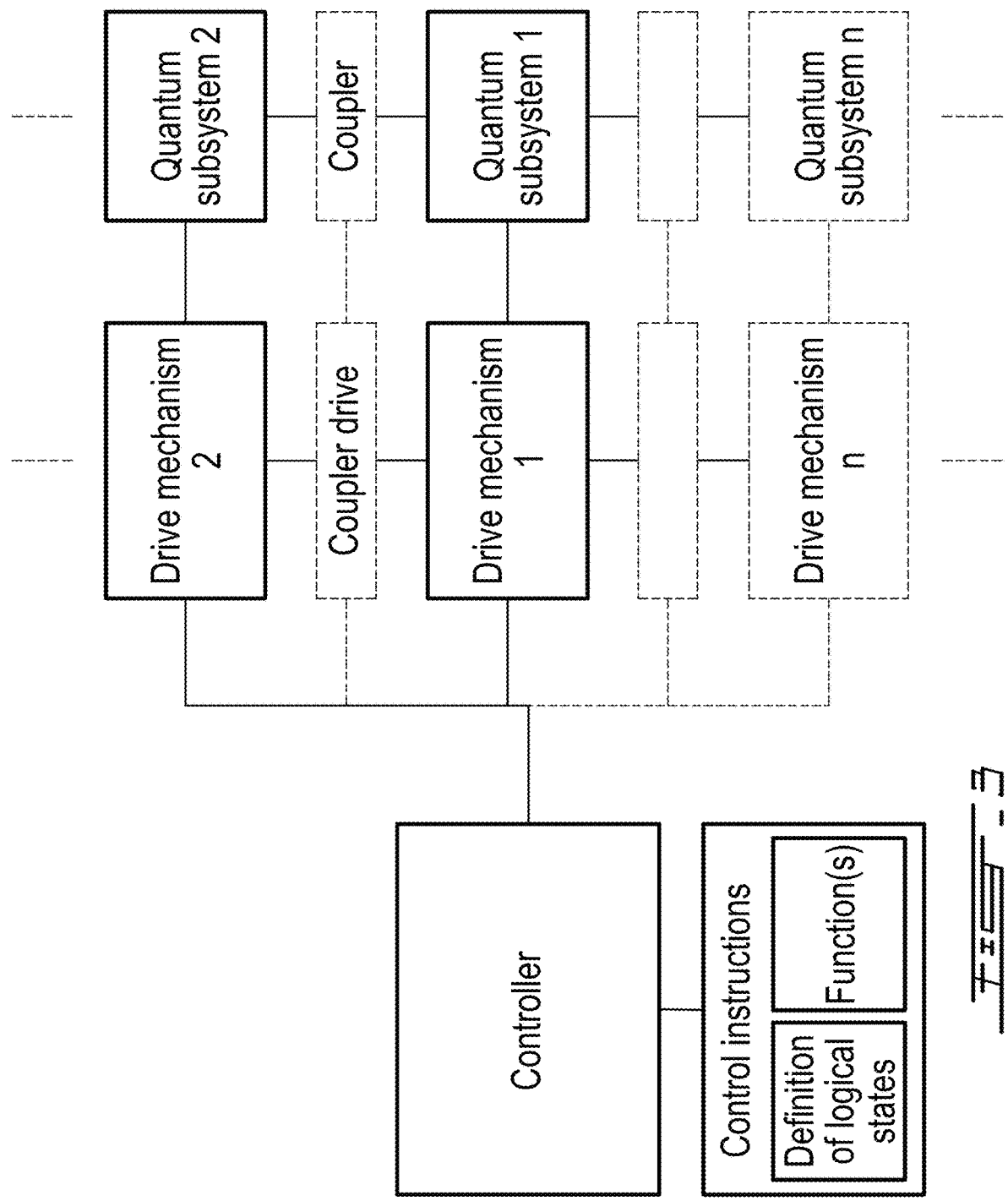
FIG. 3 is a schematic view of a quantum system which can be implemented as a quantum processor.

Depending on the type of architecture, and also the type of quantum subsystem used as the basis for the logical states, the details of implementation of a quantum processor can vary greatly from one embodiment to another. However, in general, many architectures and types will involve the use of two or more quantum subsystems to host the logical states. Indeed, as shown in FIG. 3, a typical quantum processor will require at least two quantum subsystems which will be interconnected for their coherent states to interact with one another in an interaction which will typically involve entanglement. The type of quantum subsystem will vary depending on the architecture. Most quantum systems embodied as bosonic-based quantum processors involve some form of resonator to host coherent states, and the coherent states will be driven in the quantum subsystems using some form of driving hardware which can control a number of bosons in the quantum subsystems. The driving hardware is controlled by a component which will be referred to herein as a controller, and which is typically provided in the form of a classical computer. The quantum subsystems are typically refrigerated to very low temperatures and insulated from the environment. In a quantum annealing type architecture, the quantum subsystems can be directly operably interconnected to one another. In gate-based quantum computing, the quantum subsystems are typically interconnected to one another via couplers which are used to selectively control the interaction between the quantum subsystems. The couplers are also quantum subsystems operable to host states via which the coherent states of the two or more connecting quantum subsystems are to interact, and are also driven by driving hardware which can be controlled by the same controller for convenience. Let us now look into example ways by which quantum computing can be performed using a 3-cat configuration.

A—Quantum Annealing (QA)

In QA, the qubits are operated on in a continuous fashion from the beginning of the computation to the end. The Hamiltonian that is applied on each physical qubit is varied continuously from a simple initial Hamiltonian that is intended to be easily prepared, and then varied progressively to a final form that represents the problem to be solved.

We can distinguish three important steps of the process: preparation (or initialization), evolution, and readout.

Initialization: The initialization can be done independently on each individual physical qubit, and in the simplest instance the parameters can be identical for every qubit. In most instances the qubits are initialized in the |+⟩ state (|+⟩=|0⟩+|1⟩). In the case of the proposed cubic cat encoding, this can be achieved by setting the cavity in the vacuum state and gradually increasing the active parameters of the proposed Hamiltonian (namely the parameters of the drives). In cases where the initial state should be different from the simplest case above, a more general initialization method can be used (described in the next section about gate-based models).

Evolution: During the evolution phase, the Hamiltonian is progressively varied as to represent the problem to be solved. Non-trivial problems involve the entanglement of any given qubit with at least one other qubit. In most instances, the problem Hamiltonian only involves entangling terms of the following form:

$$\sum_i \prod_{j \in S_i} \hat{\sigma}_z^{(i,j)},$$

i.e. a sum of products of Oz operators only. When this is the case, it is possible to realize inter-qubit interaction terms in the Hamiltonian that will represent the problem Hamiltonian without having to perform error correction on the qubits. This is due to the fact that $\sigma_z$ operations only impact the complex phase of the 0 component relative to its orthogonal component, and that this operation is the same on whichever of the three possible cycling states a given qubit is at any time.

Readout: The logical states of the qubits can be read out with a projective or quantum non-demolition measurement distinguishing between coherent states with different phases through a parametric beam-splitter interaction between the cubic transmon and a readout resonator.

B—Gate-Based Model (GB)

In a gate-based architecture, in principle the qubits only need to be operated on at discrete times, when a logical operation involving one or more qubit is performed. In reality, in many proposed implementations the qubits are operated on (or at least monitored) quasi-continuously for error-correction purposes.

In one proposed embodiment, we may obfuscate the need for any continuous operations or monitoring on the qubits. Error correcting operations may only be needed at discrete times, when certain types of logical operations are to be performed on one or more qubits. The method, of course, does not preclude continuous monitoring if necessary, for other purposes.

In a way similar to the QA architecture, here too we distinguish three important steps of the computational process in GB architecture: preparation (or initialization), cleaning for operations (removing errors), and readout.

Cleaning for operations: We begin by describing the second step of the process, since both initialization and readout are essentially a sub-step of this one.

The step that we will refer to herein as "cleaning", may be necessary when performing an operation that cannot be described by a product of Z-operators, as the latter operators can be impervious to the effect of photon loss.

For other operations, recouping the original state |φ⟩ may only be achievable via the use of an additional physical resource, i.e. an ancilla resource, the simplest of which is a single physical 2-cat qubit. The main idea is the following:

1) apply an entangling operation on the qutrit/ancilla system such that these two elements become entangled and that the logical qubit is now embedded in both;
2) reset the qutrit, such that the logical qubit is fully transferred to the ancilla;
3) promptly apply the reverse rotation to bring the logical qubit back into the qutrit where it is protected from the damaging effect of photon loss; and
4) reset the ancilla.

A key element in the entangling operation in step 1) above, is realized as a modified controlled-PHASE gate with the ancilla as the target and the cubic cat as the control. A description of an example sequence of operational steps involved in this process is presented in the following section.

Initialization: The initialization is performed by first preparing the desired logical state in the ancilla qubit, and then performing step 3) and 4) as above (in Cleaning for operations).

Readout: Readout is performed by applying step 1) and 2) as above (in Cleaning for operations), then performing a readout on the ancilla qubit.

High-Level Description of the Steps to Perform the Cleaning for Operations

Based on the general principles presented above, the cleaning operation can be adapted specifically to different embodiments. We will now explore a possible adaptation to the specific embodiment of a 3-cat as presented above to provide one example embodiment in detail.

From the discussion above, an objective can be limited to recovering from either a single- or two-photon loss, as a three-photon loss brings the system back to the original state. Hence the main error channel cycles between three distinct states that preserve the embedded qubit information, such that there is no need for continuous monitoring for photon loss, recovering only when needed—i.e. when applying a non-preserved gate.

Based on the general principles presented above, the cleaning operation can be adapted specifically to different embodiments. We will now explore a possible adaptation to the specific embodiment of a 3-cat as presented above to provide one example embodiment in detail.

Figure 4:
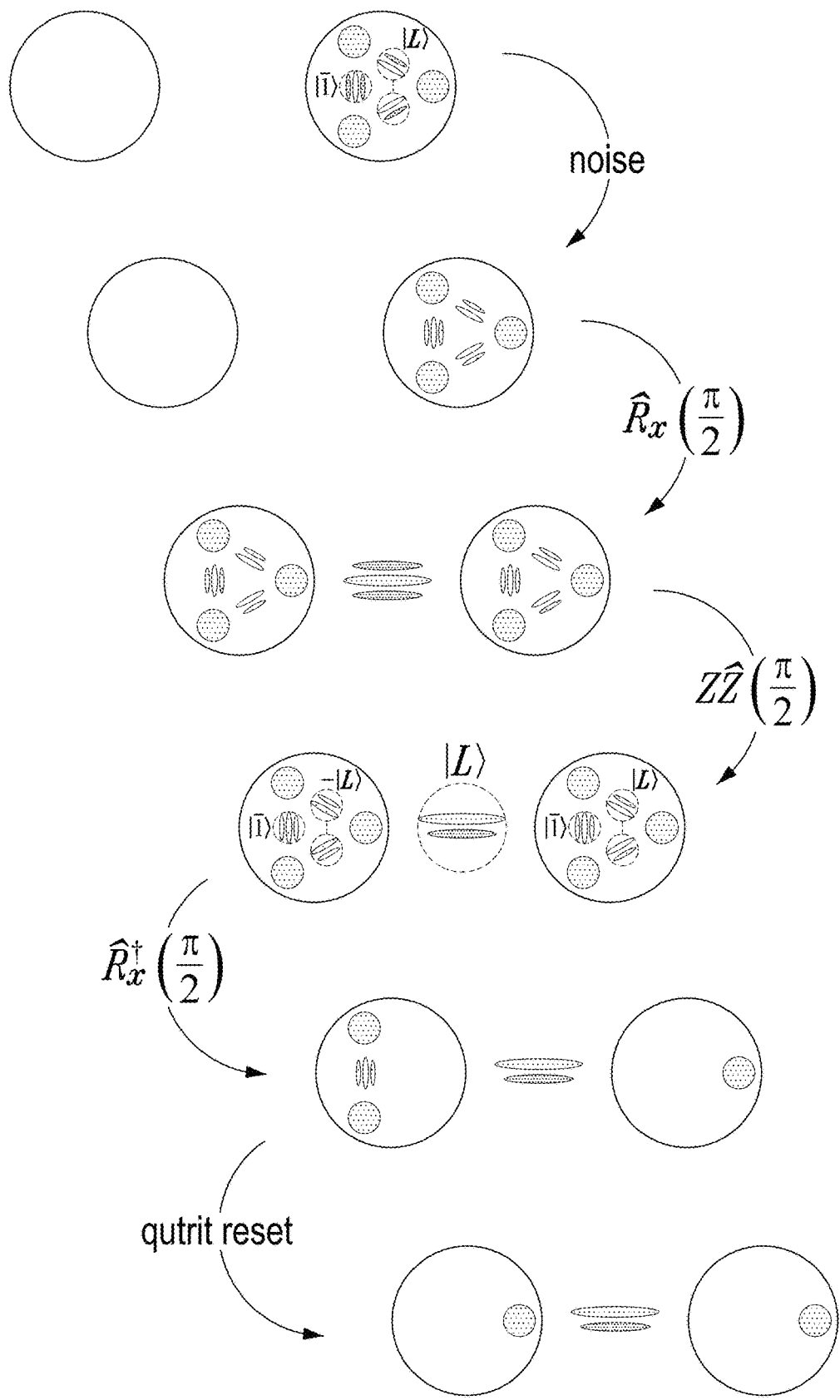
FIG. 4 is a schematic representing cleaning operation process in a step by step manner.

In FIG. 4, in order to represent the tensor product of the ancilla qubit and the qutrit, a cartoon Wigner diagram of the two legs of the ancilla 2-cat qubit is represented as two large-scale outlined red circles, and in each of these circles the corresponding cartoon Wigner diagrams of the qutrit are represented.

Just prior to correction, the qutrit is in a state ψ out of only three possible states, i.e.

$|\psi\rangle \in \{|\varphi\rangle, |\varphi'\rangle, |\varphi''\rangle\}$, with $|\varphi\rangle = u|0\rangle + ve^{i\phi}|1\rangle$ And as above $u,v \in \mathbb{R}, u^2+v^2=1, \phi \in [0,2\pi]$, and $|\phi\rangle' = \hat{a}|\phi\rangle, |\phi\rangle'' = \hat{a}^\dagger|\phi\rangle$.

One avenue would be to simply clone the state of the qutrit, measure one of the three possible states and apply the proper correction to the original qutrit. Alas the no-cloning theorem forbids it. Yet it does not forbid moving quantum information from one subsystem to another. And while there is little point in simply moving around the full qutrit, the logical qubit can be moved from inside the physical qutrit onto an additional physical qubit (referred to as an ancilla or ancillary qubit) coupled to the physical qutrit, leaving behind only the undesired dephasing, and then resetting the original qutrit in order to evacuate the noise-induced undesired dephasing (see FIG. 4).

The first operational step is to prepare the ancilla qubit in a |+⟩ state, through a $\pi/2$ x-rotation while it is still uncoupled to the qutrit (FIG. 4, $2^{nd}$ to $3^{rd}$ line). After this step, the combined qubit-qutrit system is in the following state $|+\rangle_b|\psi\rangle_t$, Where the b and t subscript refer to the qubit and qutrit respectively.

The next step, which is also the main step in this process, is to entangle the qutrit with the ancilla qubit through a specific qubit-qutrit controlled-PHASE gate CZ=ZZ($\pi/2$) that is described analytically as $CZ=ZZ(\pi/2)=|\bar{0}\rangle\langle\bar{0}|\hat{\sigma}_z+|\bar{0}_\perp\rangle\langle\bar{0}_\perp|\hat{I}$, Transforming the combined state into $u|-\rangle_b|\bar{0}\rangle_t + ve^{i\phi}|+\rangle_b|\bar{0}_\perp\rangle_t$.

This last step is illustrated on FIG. 4, $3^{rd}$ to $4^{th}$ line.

In the specific case where the ancilla qubit is a two-legged cat state, we can realize this operation by implementing the following ancilla/qutrit interaction Hamiltonian:

$$\hat{H}_{ZZ} = \hat{H}_{0,b} + \hat{H}_{0,t} + J_{b,t}(\hat{a}_t^\dagger \hat{a}_b + \hat{a}_b^\dagger \hat{a}_t) - \frac{J_{b,t}}{2}(\hat{a}_b - \hat{a}_b^\dagger)$$

Where $J_{b,t}$ is the coupling factor of a beam-splitter interaction between the ancilla and the qutrit. This allows us to implement the desired modified controlled-phase operator $ZZ(\theta) = \exp(i\theta\hat{Z}_b\hat{Z}_t/2)$ with $\theta = 3J_{b,t}\alpha^2 t_{gate}$ where $t_{gate}$ is the duration of the interaction.

The last step consists of resetting the qutrit to its |0⟩ state, which is facilitated by a prior $-\pi/2$ x-rotation on the ancilla qubit (FIG. 4, $4^{th}$ to $5^{th}$ line and $5^{th}$ to $6^{th}$ line).

Modes and Interactions

Figure 5:
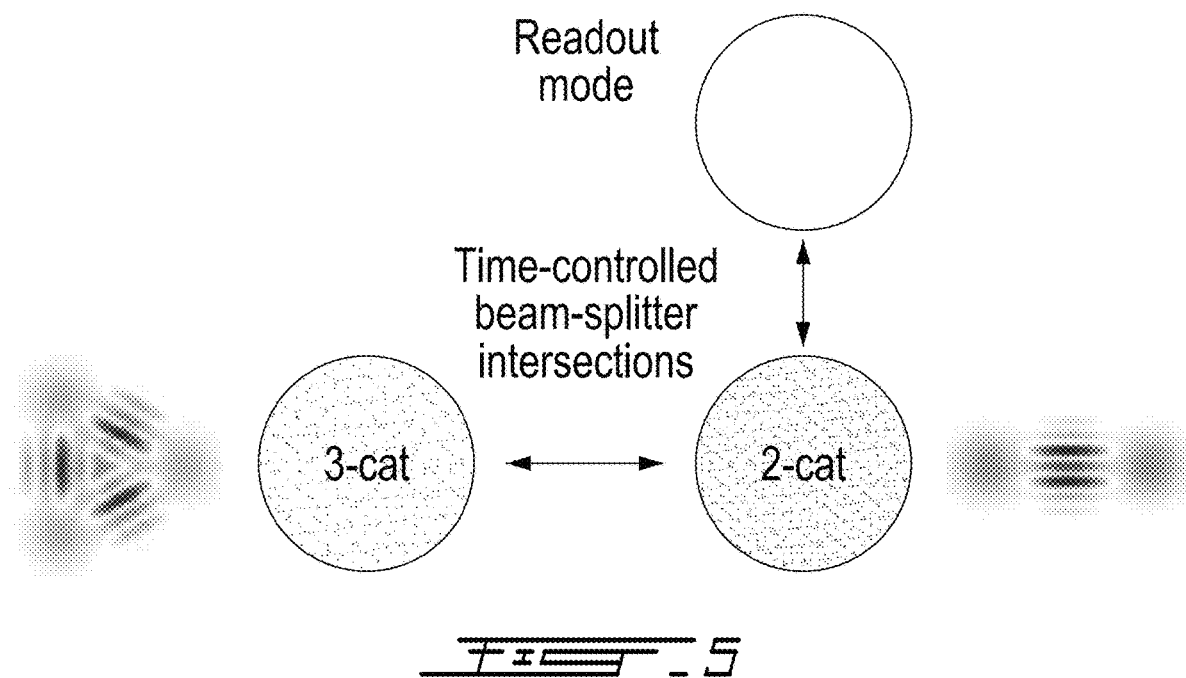
FIG. 5 is a schematic description of the modes and interactions enabling the stabilization and quantum error correction of a logical qubit embedded in a three-legged cat state (3-cat)

FIG. 5 presents a schematic representing the modes and interaction in an example embodiment in which a 2-cat quantum subsystem is appended to each 3-cat subsystem for the purpose of cleaning as presented above. In a photonic-type implementation, the mode hosting the three-legged cat can interacts with a time-controlled beam-splitter interaction with an auxiliary mode hosting a two-legged cat state (2-cat). The state of the two-legged cat can be read out through a time-controlled beam-splitter interaction to a readout mode.

Example Circuit

Figure 6:
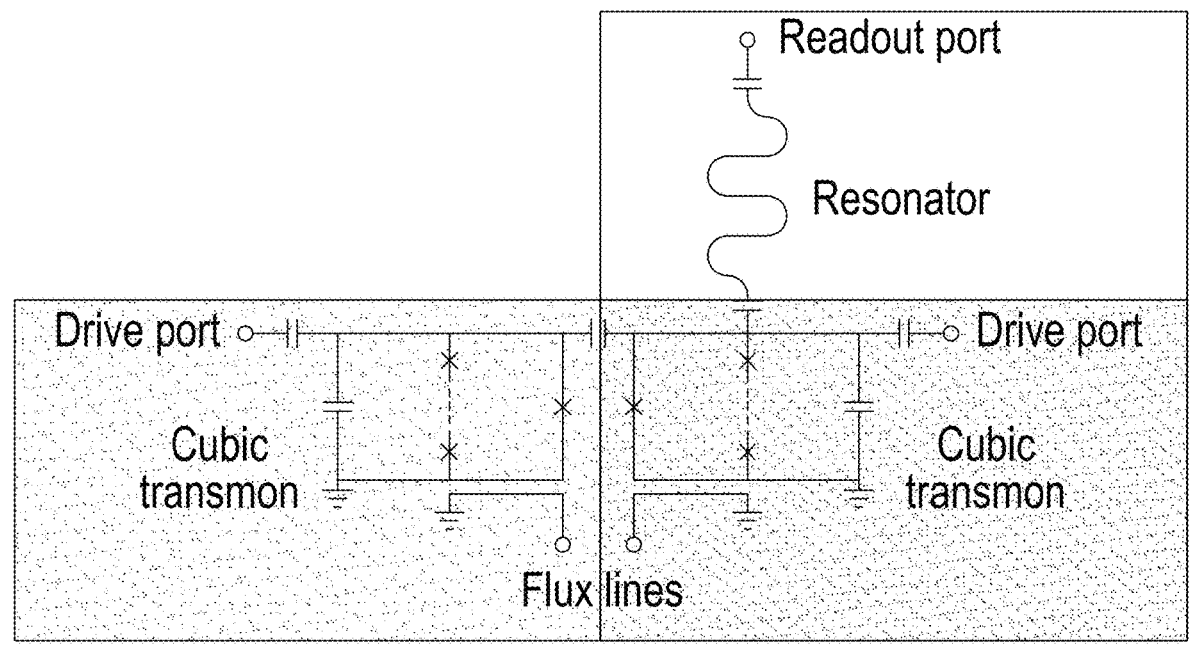
FIG. 6 is a schematic of an example circuit for implementing the proposed protocol.

FIG. 6 presents an example circuit for implementing the above-described process. The three- and two-legged cat states live in two cubic transmons, each composed of a small Josephson junction in parallel with N≥2 larger junctions and a large shunt capacitance. A finite magnetic flux is applied in the junction loop to achieve a second-order nonlinearity. The magnetic flux can be applied by individual flux lines (as shown) or by a single flux line. Individual drive ports enable one to pump the cubic transmons with one- and three-photon pumps (one- and two-photon pump) to stabilize the 3-cat (2-cat). The two cubic transmons are capacitively coupled, leading to a fixed beam-splitter interaction. When both modes are far detuned from each other, the beam-splitter interaction can lead to a static and undesired dispersive ZZ-type interaction. This interaction can be suppressed with an additional continuous drive on either of the cubic transmons. The desired time-controlled beam-splitter interaction between both cubic transmons is parametrically activated by driving either mode at their frequency difference. Quantum non-demolition readout of the two-legged cat state is performed by parametrically activating a beam-splitter interaction between the corresponding cubic transmon and a readout resonator by driving the cubic transmon at the frequency difference between the cubic transmon and the resonator.

In one example, the circuit can be outfitted with the following drives:
- Stabilization of the 3-cat: one-photon drive at the cubic transmon frequency
- Stabilization of the 3-cat: three-photon drive at three times the cubic transmon frequency
- Stabilization of the 2-cat: two-photon drive at twice the cubic transmon frequency
- Operation on the 2-cat: one-photon drive at the cubic transmon frequency
- Readout of the 2-cat: parametric drive at the difference between the 2-cat cubic transmon and the corresponding resonator
- Interaction between the 3-cat and the 2-cat: parametric drive at the difference of the cubic transmon frequencies for the time-controlled ZZ-type interaction
- Interaction between the 3-cat and the 2-cat: parametric drive to suppress the static ZZ-type interaction Example Alternate Embodiments Other Bosons than Photons The proposed scheme could be implemented in alternate architectures where modes in which the elementary excitations are other types of bosons. The most notable candidate is an architecture based on phonons. One distinct advantage of such an architecture is the demonstrations of phononic resonators with lifetimes reaching one second. Another possible implementation would be to use magnetostatic modes in which magnons are the bosonic excitations. One major challenge in this latter architecture is the small lifetime of about hundreds of nanoseconds. In both alternate physical implementations, the nonlinearity required in the proposed scheme would likely be realized by coupling the bosonic modes to a nonlinear superconducting circuit.

Possibility of stabilization of cats with N>3 legs

The second-order linearity (Pockels) and third-order non-linearity (Kerr) present in a cubic transmon provides the required terms for potentially engineering a N-photon drive for N>3. However, it will be noted that the efficiency of such a drive may decrease as N increases.

FIGS. 7a to 7j are a collection of schematic views representing encoding examples which can form the basis of a qubit. In a general form, it is proposed to perform an encoding in the context of an N-legged cat (or N-cat) state where N>2. These N individual states all lie equidistant on the circumference of a circle when represented in the phase space of a resonator cavity.

Figure 7A:
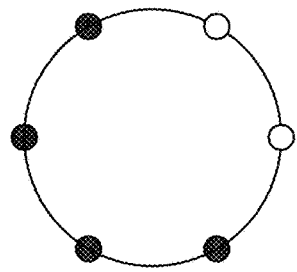
FIGS. 7a to 7j are a collection of schematic views representing N individual states in a phase space, and where the N states can be associated to logical states and form the basis of qubit encoding.
Figure 7B:
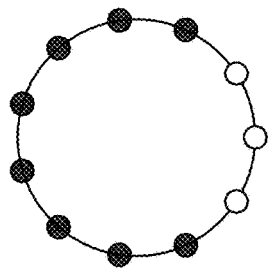
Figure 7C:
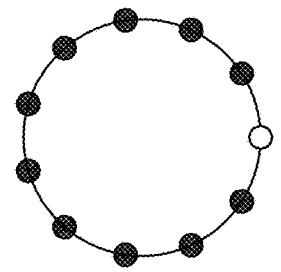
Figure 7D:
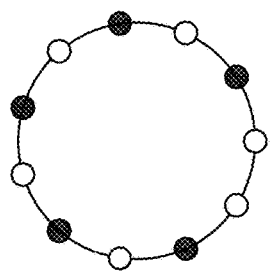
Figure 7E:
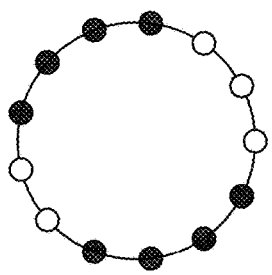
Figure 7F:
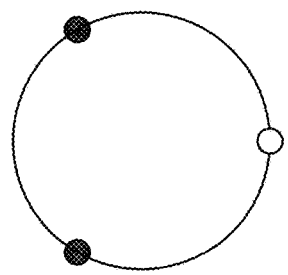
Figure 7G:
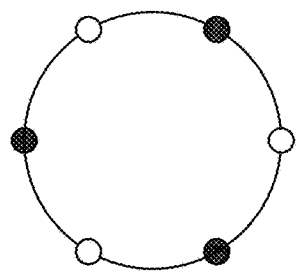
Figure 7H:
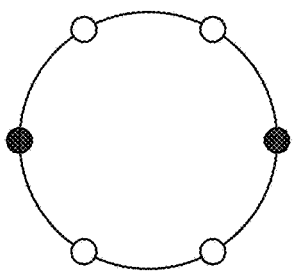
Figure 7I:
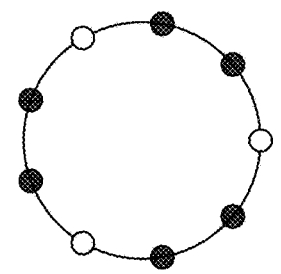
Figure 7J:
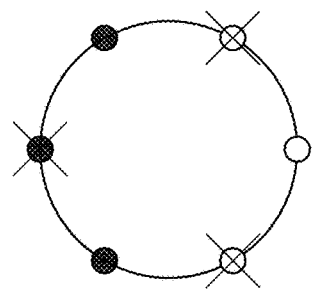

The N individual states are segmented in two subsets represented by white or black bullets, respectively, each one representing one of the two logical states of a qubit. The logical states are configured to be rotationally asymmetrical, i.e. there is no angle smaller than a full rotation by which one could rotate the logical states and fall back on the same configuration. FIGS. 7a to 7f present ways of achieving this rotational asymmetry based on the attribution of the states to given ones of the subsets, which will be referred to as asymmetry due to subset configuration. FIG. 7j presents an example where the rotational asymmetry is due to the attribution of zero coefficients to a subset configuration which is otherwise rotationally symmetrical, and can be referred to as asymmetry due to coefficient configuration. Let us begin by discussing achieving rotational asymmetry based on subset configuration.

For instance, if N is a prime number larger than two, this condition is automatically respected, in all possible configurations of segmentation between the two subsets. It should be noted however that N being an odd number does not guarantee the absence of rotational symmetry, as illustrated on FIG. 7i. FIGS. 7g and 7h also represent segmentation configurations where rotational symmetry is present. FIGS. 7a to 7f present various examples where rotational symmetry is absent.

Various methods or rules can be implemented to facilitate or automate achieving a segmentation where rotational symmetry is absent. For instance, independently of whether N is prime or not, a segmentation configuration without rotational symmetry can be achieved by choosing two contiguous subsets such as represented in FIGS. 7a to 7c. An even simpler segmentation can always be obtained by choosing a single state to represent one of the two logical states, and the N−1 remaining states to represent the other logical state, which is the case of the configuration presented in FIGS. 7c and 7f. This latter choice of configuration for relatively large N, however, can make it more challenging to achieve approximate orthogonality of both logical states, an additional requirement discussed below. In the case where N is odd, another suitable segmentation configuration can be obtained simply by alternating the segmentation, such as in FIG. 7d.

Generally, it may be preferable to elect a value of N which is low for reason of simplicity, especially where stabilization may be an issue. It can be preferred to elect a value of N or 3, 4 or 5, for instance. N=3, such as presented in FIG. 7f, can be more preferred in some embodiments, and has been elected for the basis of providing the detailed example embodiment presented below.

Once proper subsets have been selected, each quantum state ($|0\rangle$ and $|1\rangle$) can be defined by any non-trivial linear combination of the states composing their respective subset, whereas the linear combination admits complex coefficients, and the chosen state can be properly normalized. In doing so, one should ensure at least approximate, if not exact orthogonality of the two logical states.

It is also possible to adapt the encoding of logical states in a rotationally symmetrical segmentation configuration, yet whereas the particular choice of coefficients in the linear combination is such that the symmetry is broken. A simple example of such a variant is presented in FIG. 7j, where the states marked with an 'X' symbol are assigned a coefficient of zero, effectively transforming this 6-cat rotationally symmetrical segmentation configuration into a 3-cat non-symmetrical configuration. Both concepts can be combined, and a non-symmetrical configuration can further be attributed one or more zero coefficients and remain non-rotationally-symmetrical.

Figure 8C:
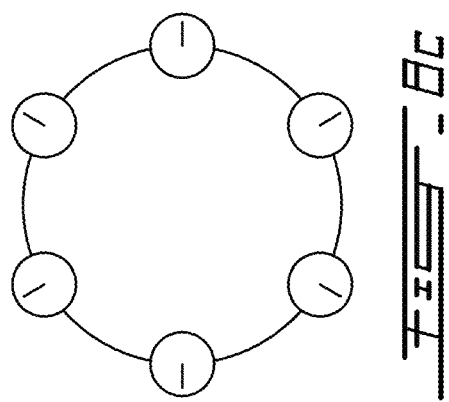
FIGS. 8a to 8e and 9a to 9f are schematic representations of the phase evolution due to successive boson losses for two example logic state definitions.
Figure 8E:
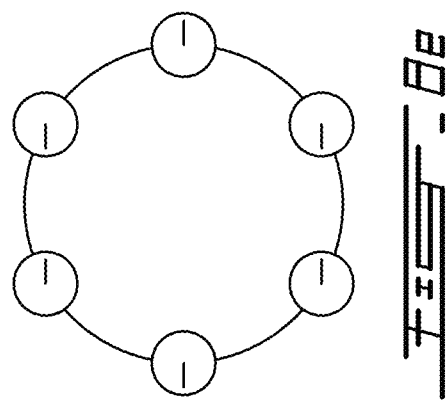

It will be noted that still other embodiments are possible. The concept can perhaps be more generally stated with reference to FIGS. 8a-8e, which schematically represents phase shifting from an initial state. In FIG. 8a, the two distinct logical states are defined as i) a superposition of the group of white dots and ii) a superposition of the group of black dots in the phase space representation of the figure. The definition each logical state involves attributing a complex number, i.e. an amplitude and a phase, for each coherent state (which can be zero, in which case the respective coherent state is excluded from the definition of the logical state). As known, a sum of squares of the amplitude of the complex numbers of each logical state is equal to 1, and the dot product of both logical states is minimized. The initial state is a given superposition of the logical states representing logical information.

Figure 8B:
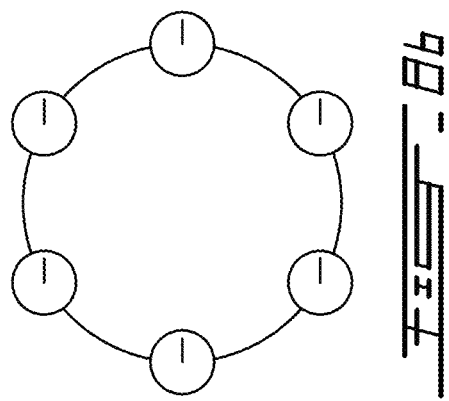
Figure 8D:
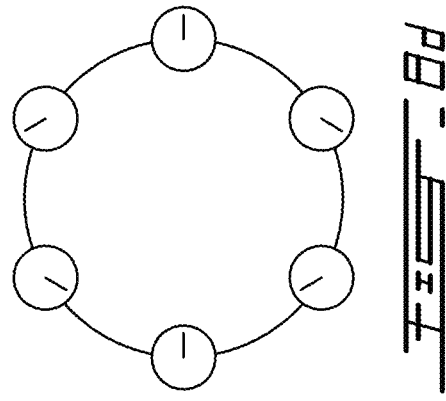
Figure 8A:
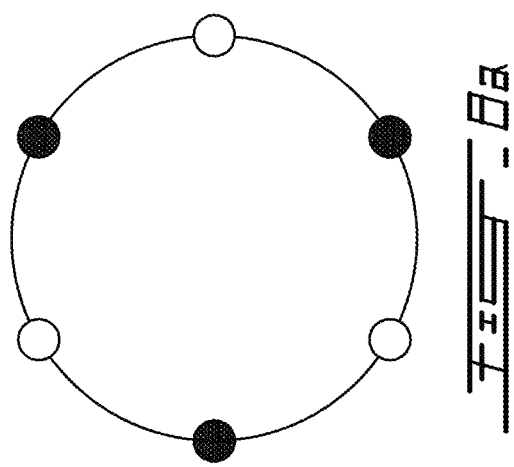
Figure 9C:
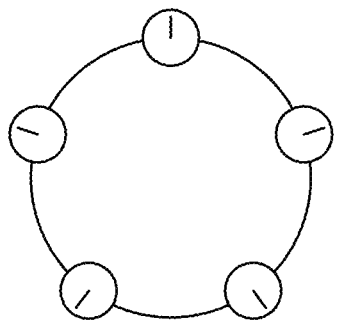
Figure 9F:
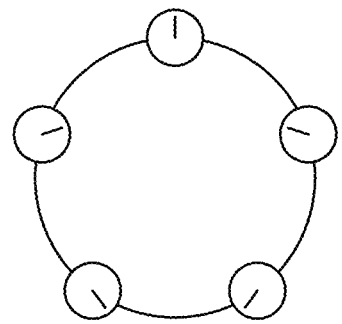
Figure 9B:
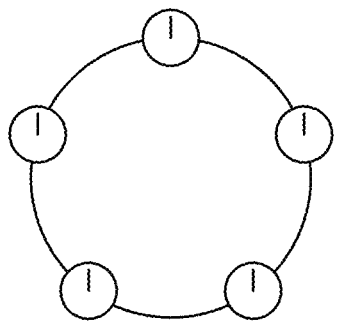
Figure 9E:
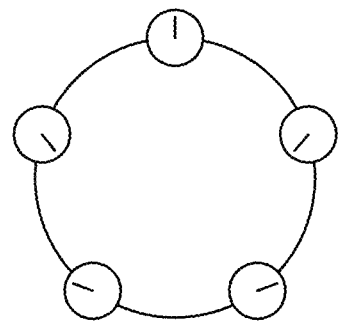
Figure 9A:
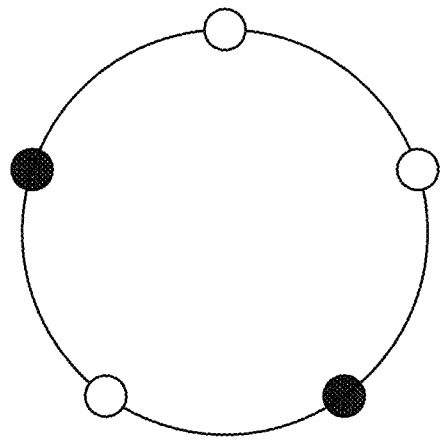
Figure 9D:
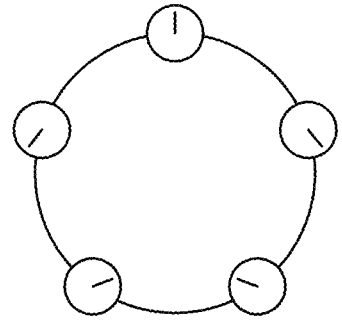

In FIG. 8b, the phases of each coherent state in the initial state is represented by a hand on a clock. In some types of undesired, or unexpected interactions with the environment, i.e. interactions which do not correspond to those driven by the control instructions, phase shifting can occur. Phase shifting is experienced differently by the different individual coherent states. For instance, FIG. 8c represents a scenario where the phase shift leaves the first coherent state (on the right hand side) unaffected, and a proportionally, and increasingly greater phase change, represented by varying positions of the hand of the clock from the first coherent state to the next in a counterclockwise sequence around the circle.

As presented in this example, the logical information is lost if the different coherent states associated to each logical state remain in phase amongst themselves, but out of phase with the coherent states associated to the other logical state. This is undesired, but can be avoided by defining the logical states in a manner for this to not happen. Many different techniques can be used to ensure that this will not happen, many of which are presented above to form the basis of numerous examples.

But other techniques can be used in other embodiments. For example, let us examine a scenario where S is the set of all n coherent states of the system, where A and B be strict subsets of S, i.e. A and B are strictly included in S (but A is not equal to N, and neither is B), where the first logical state be composed of elements of A (which could comprise all elements of A, or any subset of it), and where the second logical state is composed of elements of B (which could comprise all elements of B, or any subset of it). In such a scenario, uncorrectable errors could occur if A and B are chosen such that:

i) Both A and B are a rotationally symmetric regularly spaced subsampling of the set S (such as states 1 and 0 in upper row, and state 0 in lower row), AND ii) B can be obtained by rotating A (B is just a rotated version of A and vice versa).

Hence, in order to avoid potential issues, one can chose A and B such that:
  i) At least one of the logical states is not comprised of a subset of a rotationally symmetric subset of S, OR
  ii) If they both are, then they should not be comprised of subsets of two rotationally symmetric subsets of S that are identical up to a rotation.

By contrast with the scenario presented in FIGS. 8a-8e, another scenario is presented in FIGS. 9a-9f, using the same logics of representation. In the scenario of FIGS. 9a-9f, the logical states are defined in a manner for any of the possible increments of phase shifting, presented in FIGS. 9 c, d, e and f, from an initial state, FIG. 9b, to be constrained to lead either to one or more modified state which lies outside the logical subspace (e.g. FIGS. 9c, 9d, 9e, 9f) while preserving the logical information, or back to the initial state. Indeed, and in each of the intermediate phase shifts represented in FIGS. 9c to 9f, the coherent states of each logical state are not in phase amongst themselves while being out of phase with the coherent states associated to the other logical states.

The definition of the logical states can involve attributing a distinct combination of complex numbers to each coherent state. In the scenarios presented in FIGS. 7a-7i, 8a and 9a, the complex numbers are either weighted to 1 or to zero, and the combination of coherent states weighed to 1 in the definition of the first logical state is weighed to zero in the second logical state, and vice-versa. In the scenario presented in FIG. 7j, some coherent states are weighed to zero in the definition of both logical states, and are thus unused. In different embodiments, the exact choice of combinations of complex numbers associated with each coherent state and defining the two logical states can vary, and the logical states can share some or all coherent states and simply be weighted differently, including at values different from 1, so as to minimize their dot product. Similarly, in FIG. 9b, all the coherent states are synchronized in the initial state, but it will be understood that the coherent states can be unsynchronized from each other in the initial state.

It will be understood that the expression "computer", "classical computer", or "controller", as used herein is not to be interpreted in a limiting manner. "Computer" is rather used in a broad sense to generally refer to the combination of some form of one or more processing units and some form of memory system accessible by the processing unit(s). "Controller" is used in a broad sense to generally refer to a device which performs a function of controlling, and may be a computer or another type of device. The memory system if a computer can be of the non-transitory type. The use of the expression "computer" in its singular form as used herein includes within its scope the combination of a two or more computers working collaboratively to perform a given function, independently of whether these two or more computers are local, remote, or distributed. Moreover, the expression "computer" as used herein includes within its scope the use of partial capabilities of a given processing unit.

A processing unit can be embodied in the form of a general-purpose micro-processor or microcontroller, a digital signal processing (DSP) processor, an integrated circuit, a field programmable gate array (FPGA), a reconfigurable processor, a programmable read-only memory (PROM), to name a few examples.

The memory system can include a suitable combination of any suitable type of computer-readable memory located either internally, externally, and accessible by the processor in a wired or wireless manner, either directly or over a network such as the Internet. A computer-readable memory can be embodied in the form of random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) to name a few examples.

A computer can have one or more input/output (I/O) interface to allow communication with a human user and/or with another computer via an associated input, output, or input/output device such as a keyboard, a mouse, a touch-screen, an antenna, a port, etc. Each I/O interface can enable the computer to communicate and/or exchange data with other components, to access and connect to network resources, to serve applications, and/or perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, Bluetooth, WiMAX), SS7 signaling network, fixed line, local area network, wide area network, to name a few examples.

It will be understood that a computer can perform functions or processes via hardware or a combination of both hardware and software. For example, hardware can include logic gates included as part of a silicon chip of a processor. Software (e.g. application, process) can be in the form of data such as computer-readable instructions stored in a non-transitory computer-readable memory accessible by one or more processing units. With respect to a computer or a processing unit, the expression "configured to" relates to the presence of hardware or a combination of hardware and software which is operable to perform the associated functions.

As can be understood, the examples described above and illustrated are intended to be exemplary only. The scope is indicated by the appended claims.

What is claimed is:

1. A quantum computing system comprising:
  a quantum subsystem drivable to host a bosonic cat state having N coherent states wherein N is a prime number greater than two, the N coherent states defining a computational space;
  driving hardware operably connected to drive the quantum subsystem to host the bosonic cat state, said driving further comprising controlling a number of bosons in the quantum subsystem; and
  a controller operably connected to control the driving hardware in accordance with control instructions,
  wherein the control instructions include a function to generate via said controller an initial state of the bosonic cat state defined as a given superposition of two distinct logical states representing logical information, the two distinct logical states spanning a logical subspace within the computational space; and
  wherein said initial state of the bosonic cat state is generated so that phase shifting from the initial state stemming from any number of boson losses in the quantum subsystem occurring outside of said controlling the number of bosons is constrained to either lead:
    i) to a modified state which lies outside the logical subspace while preserving said logical information, or ii) back to the initial state; and wherein the N coherent states are representable as points around a circle in a phase space of the quantum subsystem, and wherein the logical states are rotationally asymmetric in said phase space when the bosonic cat state is rotated around a circle in the phase space due to said any number of boson losses;

wherein a rotational symmetry is broken by attributing a coefficient of zero to at least one of the coherent states; wherein N=3;

wherein the quantum subsystem is drivable to host coherent states $|a\rangle$, $ae^{2\pi i/3}\rangle$, $|ae^{-2\pi i/3}\rangle$, wherein a first one of the logical states is encoded as a first one of the coherent states, a second one of the logical states is encoded in a combination of the two other coherent states;

wherein said bosons are photons, and wherein:
the quantum subsystem is a superconducting circuit comprising a resonator having a resonator frequency;
the driving hardware includes a three-photon drive having a drive frequency; and
the bosonic cat state is driven by the driving hardware based on the Hamiltonian $H_{NEW} = -K\hat{a}^{\dagger 2}\hat{a}^2 + \varepsilon_3(\hat{a}^{\dagger 3} + \hat{a}^3) + \Delta\hat{a}^{\dagger}\hat{a}$ where K is an amplitude of a Kerr nonlinearity, $\varepsilon_3$ is an amplitude of the three-photon drive, and A is a detuning between the drive frequency and the resonator frequency; and
wherein the controller is further configured to control the driving hardware such that $|\varepsilon_3|\Delta|$, and $\varepsilon_3 (\hat{a}^{\dagger 3}+\hat{a}^{\dagger 3}) \ll \Delta\hat{a}^{\dagger}\hat{a}$.

2. The quantum computing system of claim 1 further comprising an ancillary subsystem drivable to host a bosonic cat state having 2 coherent states, the ancillary subsystem being selectively connectable in a manner for the coherent states of the ancillary subsystem to be selectively entangled or disentangled from the coherent states of the quantum subsystem.

3. The quantum computing system of claim 2, wherein:
the quantum subsystem comprises a first cubic transmon having a first cubic transmon frequency; and
the ancillary subsystem comprises:
a second cubic transmon capacitively coupled to the first cubic transmon and having a second cubic transmon frequency;
a readout resonator coupled to the second cubic transmon and having a resonant frequency; and
the driving hardware includes:
a one-photon drive connected to the first cubic transmon and operating at the first cubic transmon frequency;
a three-photon drive connected to the first cubic transmon and operating at three times the first cubic transmon frequency;
a two-photon drive connected to the second cubic transmon and operating at twice the second cubic transmon frequency;
a one photon drive connected to the second cubic transmon and operating at the second cubic transmon frequency;
a first parametric drive operating at the difference of the first and second cubic transmon frequencies for a time-controlled zz-type interaction connected between the first cubic transmon and the second cubic transmon;
a second parametric drive connected between the first cubic transmon and the second cubic transmon and configured to suppress a static ZZ-type interaction; and
a third parametric drive connected to the second cubic transmon and operating at the difference between the second cubic transmon frequency and the readout resonator frequency.

4. A method of hosting, in a quantum subsystem, a bosonic cat state having N coherent states wherein N is a prime number greater than two, the N coherent states defining a computational space, the method comprising:
generating in the quantum subsystem, via a driving hardware operably connected to drive the quantum subsystem to host the bosonic cat state and controlling a number of bosons in the quantum subsystem, an initial state of the bosonic cat state, the initial state being a given superposition of two distinct logical states representing logical information, the two distinct logical states spanning a logical subspace within the computational space, the two logical states being defined in a manner so that phase shifting from the initial state stemming from any number of boson losses occurring outside of said controlling the number of bosons is constrained to either lead:
i) to one or more modified state which lies outside the logical subspace while preserving said logical information; or
ii) back to the initial state; and
wherein the N coherent states are representable as points around a circle in a phase space of the quantum subsystem, and wherein the logical states are rotationally asymmetric in said phase space when the bosonic cat state is rotated around the circle due to said any number of boson losses; and
further comprising detecting a logical error in the coherent states including detecting said modified state; and
wherein N=3, and further comprising:
driving a bosonic cat state having two coherent states in an ancillary subsystem;
moving the logical states from the bosonic cat state of the quantum subsystem to the bosonic cat state of the ancillary subsystem;
resetting the coherent states of the quantum subsystem; and
returning the logical states from the bosonic cat state of the ancillary subsystem to the bosonic cat state of the quantum subsystem.

5. The method of claim 4, wherein the bosons are photons, and wherein the bosonic cat state of the quantum subsystem is hosted in a first photonic mode, the bosonic cat state of the ancillary subsystem is hosted in a second photonic mode; and
further comprising:
interacting the coherent states of the quantum subsystem and the coherent states of the ancillary subsystem via a time-controlled beam-splitter interaction; and
reading the bosonic cat state of the ancillary subsystem via a second time-controlled beam-splitter interaction.

6. The method of claim 4, wherein said bosons are photons, the quantum subsystem is a superconducting circuit comprising a resonator having a resonator frequency, the driving hardware includes a three-photon drive having a drive frequency and wherein said generating the initial state includes setting a cavity of the quantum subsystem to a vacuum state and gradually increasing drive parameters of an Hamiltonian $H_{NEW}=-K\hat{a}^{\dagger 2}\hat{a}^2+\varepsilon_3(\hat{a}^{\dagger 3}+\hat{a}^3)+\Delta\hat{a}^{\dagger}\hat{a}$ where K is an amplitude of a Kerr nonlinearity, $\varepsilon_3$ is an amplitude of the three-photon drive, and $\Delta$ is a detuning between the drive frequency and the resonator frequency.

7. The method of claim 4, wherein said applying an entangling operation is realized as a modified controlled-phase gate with the ancillary subsystem set as a target and the quantum subsystem as a control.

8. Control instructions stored in a non-transitory computer readable memory, the control instructions comprising:
- a function to, when executed by a computer, generate, in a quantum subsystem, an initial state of a bosonic cat state having N coherent states wherein N is a prime number greater than two, the N coherent states defining a computational space, the initial state defined as a given superposition of two distinct logical states representing logical information, the two distinct logical states spanning a logical subspace within the computational space, and in which at least one interaction type between the bosonic cat state and an environment which do not stem from the control instructions lead to phase shifting of the N coherent states; and
- a definition of the two distinct logical states, said definition constraining the evolution of the bosonic cat state from the initial state upon any of said phase shifting to either one or more modified states which lie outside the logical subspace while preserving said logical information or back to the initial state; and wherein the N coherent states are representable as points around a circle in a phase space of the quantum subsystem, and wherein the logical states are rotationally asymmetric in said phase space when the bosonic cat state is rotated around a circle in the phase space due to said any number of boson losses;

wherein a rotational symmetry is broken by attributing a coefficient of zero to at least one of the coherent states;

wherein N=3;

wherein the quantum subsystem is drivable to host coherent states $|a\rangle$, $|ae^{2\pi i/3}\rangle$, $|ae^{-2\pi i/3}\rangle$, wherein a first one of the logical states is encoded as a first one of the coherent states, a second one of the logical states is encoded in a combination of the two other coherent states;

wherein said bosons are photons, and wherein:
- the quantum subsystem is a superconducting circuit comprising a resonator having a resonator frequency and a driving hardware;
- the driving hardware includes a three-photon drive having a drive frequency; and
- the bosonic cat state is driven by the driving hardware based on the Hamiltonian $H_{NEW}=-K\hat{a}^{\dagger 2}\hat{a}^2+\varepsilon_3(\hat{a}^{\dagger 3}+\hat{a}^3)+\Delta\hat{a}^{\dagger}\hat{a}$ where K is an amplitude of a Kerr nonlinearity, $\varepsilon_3$ is an amplitude of the three-photon drive, and $\Delta$ is a detuning between the drive frequency and the resonator frequency; and
- wherein the controller is further configured to control the driving hardware such that $|\varepsilon_3|\ll|\Delta|$, and $\varepsilon_3(\hat{a}^{\dagger 3}+\hat{a}^3)\ll\Delta\hat{a}^{\dagger}\hat{a}$.

* * * * *